United States Patent

[11] 3,591,112

| | | | |
|---|---|---|---|
| [72] | Inventor | Edwin J. Garmhausen |
| | | Sidney, Ohio |
| [21] | Appl. No. | 881,653 |
| [22] | Filed | Dec. 3, 1969 |
| [45] | Patented | July 6, 1971 |
| [73] | Assignee | Scott Port-A-Fold, Inc. |
| | | Archibold, Ohio |

[54] BOAT SEAT CLAMP
1 Claim, 3 Drawing Figs.

[52] U.S. Cl. .................................................. 248/226 B, 24/263 B
[51] Int. Cl. .................................................. A47f 5/00
[50] Field of Search ........................................... 248/226, 226.2, 226.3, 316, 316.2, 316.3; 24/263 B, 263.4, 263 PJ, 263.3

[56] References Cited
UNITED STATES PATENTS
52,958 3/1866 Briggs ........................... 24/263 UX
2,707,089 4/1955 Jackson ........................... 248/226 X
2,707,513 5/1955 Lake ................................. 248/226 X FOREIGN PATENTS
1,038,248 9/1958 Germany ........................... 24/263

*Primary Examiner*—J. Franklin Foss
*Attorney*—Kimmel, Cromwell and Weaver

ABSTRACT: A boat seat clamp for detachably securing a fishing chair to a bench-type boat seat by friction clamping to the boat seat. The clamp is provided with a horizontal bar which can be adjusted for length and is secured to the fishing chair. A clamp member is slidably mounted on one end of the bar and locks to the bar by cam action under clamping pressure. A second clamp member is also mounted on the other end of the bar in a position to be engaged by hand actuated eccentric which presses the second clamp member inwardly toward the first clamp member to detachably clamp the boat seat therebetween.

PATENTED JUL 6 1971
3,591,112
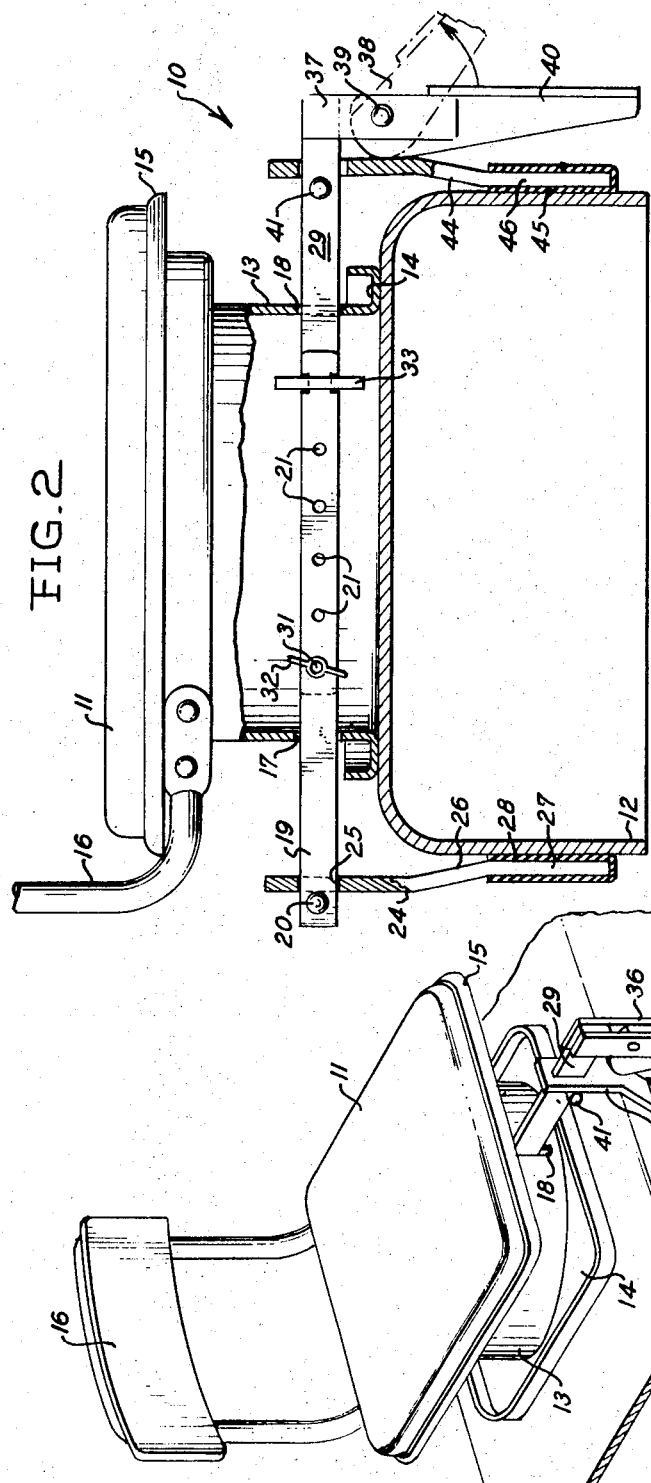
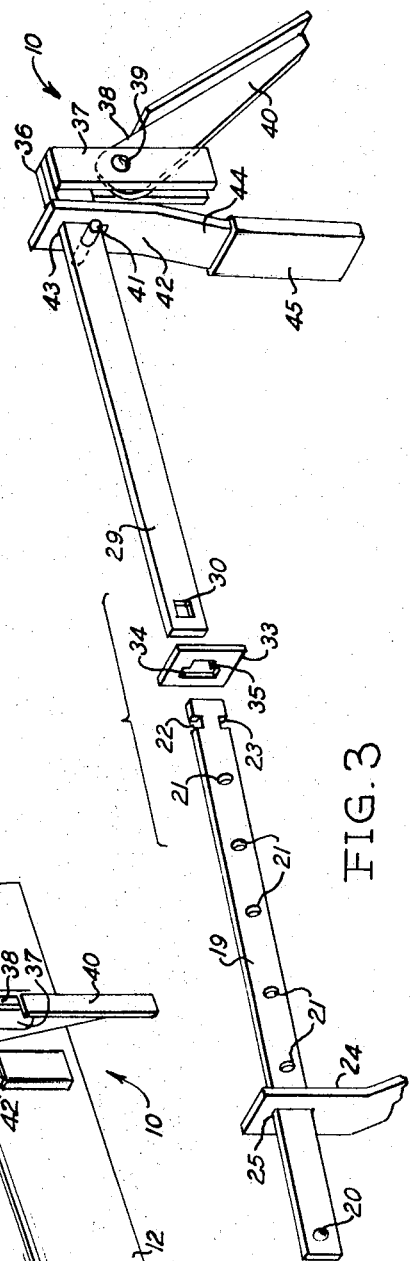
FIG. 1
FIG. 2
FIG. 3
INVENTOR.
ERWIN J. GARMHAUSEN
BY
Kimmel, Crowell & Weaver
ATTORNEYS 3,591,112

1

BOAT SEAT CLAMP

BACKGROUND OF THE INVENTION

1. Field of the Invention

The present invention is directed to the attachment of a portable fishing chair or stadium seat to a bench-type seat which is backless such as is found in stadiums and in fishing boats. Prolonged use of the bench seats produces backache and considerable discomfort for the spectator or fisherman.

2. Description of the Prior Art

Prior art devices for attaching chairs to stadium benches and bench type seats of fishing boats conventionally have included screw-threaded clamp members, opposed hooks, and various forms of clamps which are permanent portions of the fishing chair and are rather expensive and difficult to install in a safe manner.

SUMMARY OF THE INVENTION

The present invention relates to a clamp for detachably securing a fishing chair to a boat seat and is a relatively inexpensive, easily adjustable device which can be quickly and easily attached to seats of varying widths without the use of tools.

The primary object of the invention is to provide a clamp for stadium seats and fishing boat chairs which is simple to attach, positive in its action, and which is inexpensive to manufacture.

Other objects and advantages will become apparent in the following specification when considered in light of the attached drawings.

BRIEF DESCRIPTION OF THE DRAWING

FIG. 1 is a perspective view of the invention shown attached to a fishing chair and a boat seat;

FIG. 2 is a vertical sectional view shown partially broken away and in section for convenience of illustration;

FIG. 3 is a perspective view of the clamp shown partially disassembled for convenience of illustration.

DESCRIPTION OF THE PREFERRED EMBODIMENT

Referring now to the drawings in detail wherein like reference characters indicate like parts throughout the several Figures, reference numeral 10 indicates generally a boat seat clamp constructed in accordance with the invention.

The boat seat clamp 10 is provided for detachably connecting a chair type construction 11 to a bench type boat seat 12 as is seen in FIGS. 1 and 2. The boat seat 12 as shown here is formed of shaped aluminum but could also be a wooden plank such as is used in a common wooden fishing boat.

The fishing chair 11 includes a base 13 of generally cylindrical form which terminates in a generally rectangular bottom 14. A seat 15 is supported on the base 13 and has a back 16 extending upwardly therefrom. The seat 15 may either be fixed to the base 13 or revolved thereon as desired.

The base 13 is provided with a pair of oppositely disposed apertures 17, 18 through which the clamp 10 extends.

The clamp 10 includes an elongate flat bar 19 having a pin 20 extending through its outer end. A plurality of longitudinally spaced transverse bores 21 extend through the bar 19 intermediate the opposite ends thereof. A pair of notches 22, 23 are formed respectively in the upper and lower edges of the bar 19 adjacent the inner end thereof. A clamp member 24 is provided with an aperture 25 which is of a size and shape to permit the bar 19 to slide freely therethrough. The clamp member 24 is inwardly offset at 26 and has a lower end portion 27 covered with a rubber sleeve 28. A second elongate bar 29 is provided at its inner end with a generally square opening 30 extending transversely therethrough to receive the square shoulder of a carriage bolt 31 which also extends through one of the bores 21 and is secured thereon by a wing nut 32. A keeper plate 33 has a generally rectangular opening 34 with an offset extension 35 intermediate the opposite ends of the rectangular opening 34. The plate 33 is adapted to engage over the bar 19 and then to be moved transversely so that the ends of the offset opening 35 engage in the slots 22, 23. The second bar 29 is then inserted through the generally rectangular opening 34 and moved so that the square opening 30 is opposite one of the bores 21, whereupon the carriage bolt 31 is inserted and the thumb nut 32 is locked thereon.

A pair of arms 36, 37 are arranged on opposite sides of the bar 29 at the end thereof opposite the square opening 30 and are welded in perpendicularly extending relation to the bar 29 so as to form a spaced-apart extension. An eccentric cam 38 is positioned between the arms 36, 37 and pivotally secured thereto by a pivot pin 39. A handle 40 extends integrally from the eccentric 38 for rotating the eccentric 38 on the pivot pin 39.

A stop pin 41 extends through and is rigidly secured to the bar 29 at a point spaced apart from the arms 36, 37. A clamp member 42 identical to the clamp member 24 is provided with an opening 43 for the bar 29 to extend through and has an inwardly offset central portion 44. A rubber sleeve 45 encompasses the lower portion 46 of the clamp member 42 to cushion the clamp member 42 and prevent damage to the seat on which it is clamped.

In the use and operation of the invention the bars 19, 29 are inserted through the openings 17, 18 respectively, of the base 13 and the keeper 33 and bolt 31 are assembled thereon to lock the bar 19 and the bar 29 together. With the handle 40 in raised position, the assembly is positioned on a boat seat 12 with the clamp members 24, 42 in engagement with the opposite sides edges thereof, whereupon the handle 40 is swung inwardly and downwardly to cam the clamp member 42 more tightly into engagement with the seat 12, thus clamping the seat 11 thereto. The stop pin 41 maintains the clamp member 42 closely adjacent the eccentric 38 and the pin 20 prevents the clamp member 24 from sliding off of the bar 19. If a slightly narrower seat is encountered, the clamp member 24 is slid inwardly on the bar 19 until it is in engagement with the side edge of the seat and is locked in this new position by the cam action of the opening 25 on the bar 19. Obviously if still narrower or wider seats are encountered, the bolt 31 will be moved into a new one of the bores 21 to provide the desired adjustment.

Having thus described the preferred embodiment of the invention, it should be understood that numerous structural modifications and adaptations may be resorted to without departing from the spirit of the invention.

What I claim is:

1. A boat seat clamp comprising:
   a pair of generally elongated flat bars (19, 29) having inner end portions disposed in side-by-side sliding arrangement with respect to one another for adjustment relative to each other in the direction of their elongation, one (19) of said bars having oppositely disposed notches (22, 23) formed in the inner edge portions thereof;
   means (31,32) for releasably securing said bars (19, 29) in a longitudinal adjustment relative to one another;
   a first clamp member (24) mounted on an outer end portion of said one (19) of said bars for engagement with one side of the object (12) to be clamped;
   an eccentric (38) and handle means (40) integrally formed therewith and projecting away therefrom to provide means for effecting the actuation of said eccentric (38);
   means pivotally mounting said eccentric (38) on the outer end portion of the other (29) of said bars, said pivotal connecting means including a pair of spaced parallel arms (36, 37) rigidly secured to the other (29) of said bars adjacent its outer end portion and depending therefrom, and a pivot pin (39) extending through said eccentric (38) and said arms (36, 37);
   a second clamp member (44) mounted for swinging movement on the outer end of said other bar (29) and in the path of movement of said eccentric (38) in one direction whereby said second clamp member (44) is engaged and swung by said eccentric (38) towards said first clamp member (24) and towards the other side of the object (12) to be clamped, all upon the pivotal movement of said eccentric (38) in said one direction;

means (41) on said other (29) bar for retaining said other clamp member (44) adjacent said eccentric (38); and keeper means for releasably holding said inner end portions of said bars (19, 29) in their said side-by-side arrangement, said keeper means comprising a plate (33) having a first opening (34) extending transversely therethrough and a second offset extension (35) thereof, said plate (33) receiving said inner end portion of said one bar (19) therethrough with said offset extension (35) being engaged within said notches (22, 23), and said inner end portion of said other bar (29) being freely slidable through said opening (34).